E. C. SMITH.

Assignor, by direct and mesne assignments, to THE UNIVERSAL LOCK COMPANY.

LOCK.

No. 11,119. Reissued Nov. 11, 1890.

Attest:
C. M. Benjamin
Frank J. Sayers.

Inventor:
Eugene Charles Smith
by Walter Brown
Attorney.

THE NORRIS PETERS CO., PHOTO-LITHO., WASHINGTON, D. C.

UNITED STATES PATENT OFFICE.

EUGENE CHARLES SMITH, OF NEW YORK, N. Y., ASSIGNOR, BY DIRECT AND MESNE ASSIGNMENTS, TO THE UNIVERSAL LOCK COMPANY, OF NEW YORK.

LOCK.

SPECIFICATION forming part of Reissued Letters Patent No. 11,119, dated November 11, 1890.

Original No. 387,372, dated August 7, 1888. Application for reissue filed August 26, 1890. Serial No. 363,150.

*To all whom it may concern:*

Be it known that I, EUGENE CHARLES SMITH, of the city, county, and State of New York, have invented certain new and useful Improvements in Locks for Freight-Cars, of which the following is a specification.

This invention has reference to an improved lock for the doors of freight-cars, said lock having the advantage of being locked by any one of a series of keys that are adapted to the lock, but which can be only opened by the use of the same key by which the locking of the door-lock has been accomplished.

The invention consists of a lock for the doors of freight-cars, and other purposes, which comprises a slide-bolt, a series of guided and spring-actuated tumblers arranged at right angles to and near the rear end of said slide-bolt, a locking-bar for retaining all the tumblers in locked position, a series of pivoted cams operated by the wards of the key, and an axially-turning and longitudinally-recessed key-cylinder above said cams, all the parts being inclosed in a suitable case that is applied to the door and worked in connection with a fixed staple on the door-jamb of the car, as will appear more fully hereinafter, and finally be pointed out in the claims.

Figure 1:
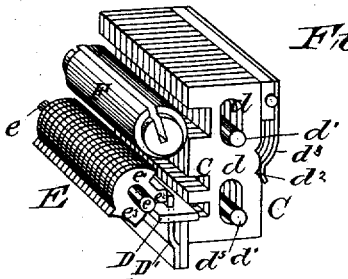
Figure 4:
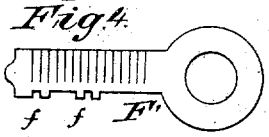
Figure 2:
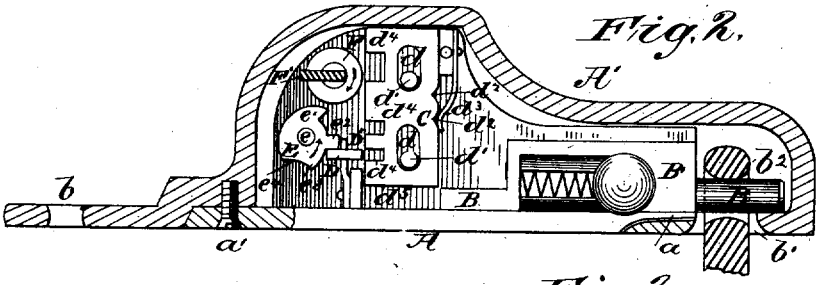
Figure 3:
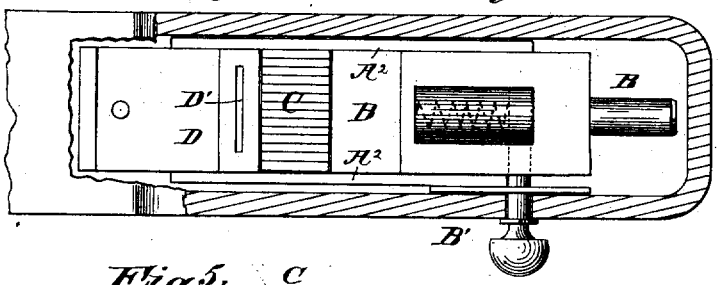
Figure 5:
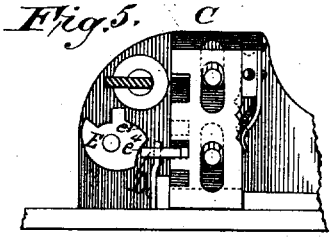

In the accompanying drawings, Figure 1 represents a perspective view of the interior working parts of my improved freight-car-door lock, showing the relative arrangement of the tumblers, the locking-bar, the actuating-cams, and the key-cylinder. Fig. 2 is a vertical longitudinal section of the lock, drawn on a larger scale. Fig. 3 is a top view of the same, with the casing and some of the working parts removed, so as to show the slide-bolt, tumblers, and tumbler-locking plate. Fig. 4 is a side view of one of the keys used in connection with my improved lock; and Fig. 5 is a side view of the working parts of the lock, showing them in position for locking the slide-bolt.

Similar letters of reference indicate corresponding parts.

In the drawings, A represents the base-plate, and $A^2$ $A^2$ the side plates, which extend at right angles from the base-plate, and which serve with the base-plate to support the working parts of my improved lock for freight-car doors. The base-plate A is attacked to the inclosing-casing A′ by a tongue $a$ at one end and a screw $a'$ at the opposite end, the casing being applied by an eye $b$ at one end to a suitable staple of the door and provided at the opposite end with a recess $b'$ for the locking-staple $b^2$, applied to the jamb of the door-frame of the car.

The parts which compose my improved lock are a slide-bolt B, which is guided by side plates $A^2$ along the base-plate A, a series of tumblers C, a locking-bar D, actuating-cams E, and key-cylinder F, which are supported by the side plates $A^2$. The tumblers C are arranged at right angles to and near the rear end of the slide-bolt B and guided by slots $d$ $d$ on fixed pins $d'$ $d'$, extended transversely from one side plate $A^2$ to the other. The tumblers C C are provided at one edge with two notches $d^2$ $d^2$, that are engaged by springs $d^3$ when the tumblers are pushed forward or backward, and at the opposite edge with three recesses $d^4$ $d^4$, of which two are arranged at that part of the tumblers nearer to the slide-bolt, while the third one is arranged at that part of the tumblers farthest from the slide-bolt, as shown in Fig. 2. Near the recesses $d^4$, closer to the slide-bolt B, is arranged the transverse locking-bar D, which is supported by a flat spring D′, the free end of said spring engaging a slot of the locking-bar D, while the opposite end is attached to a bracket-plate extending transversely between the side plates $A^2$, as shown in Fig. 2. Sidewise of and close to the locking-bar D is arranged a series of actuating-cams E, that are supported on a fixed pivot $e$, said cams being provided with projections $e'$ $e^2$, of which the projections $e'$ are engaged by the wards of the key F′, projecting beyond the key-cylinder F when closing the lock, while the projections $e^2$ are engaged by the wards of the key when opening the lock. The cams E are provided below the projections $e^2$ with eccentric portions $e^3$, which are pressed against the locking-bar D when the cams E are turned on the fixed pivot $e$ by the wards of the key. The eccentric portions $e^3$ move the locking-bar into the lower recesses of the tumblers, while concave portions $e^4$ of the cams, next adjoining the eccentric portions, serve to retain the locking-bar in the recesses of the tumblers and prevent the accidental release of the locking-bar from the same, as shown in Fig. 5. The key-cylinder F is supported in suitable bearings of the side plate and turned by inserting the key F′ through slots in the casing A′ and side plate $A^2$ into a longitudinal recess of the key-cylinder. By turning the key-cylinder with the key the projecting wards *f* of the key F′ engage first the outermost recesses $d^4$ of a corresponding number of tumblers and push forward as many tumblers as there are wards on the key, the tumblers moved corresponding to the relative positions of the wards on the keys. The tumblers, actuated by the wards of the key F′, are pushed across the rear part of the slide-bolt B, so as to prevent the drawing back of the same, and lock the same rigidly in position. By continuing the turning motion of the key and key-cylinder the projecting wards *f* also engage the projections *e′* of a corresponding number of cams, so as to turn on their fixed pivot and produce by their eccentric portions the forward motion of the locking-bar into the second recesses $d^4$ of the tumblers that have been moved forward and into the first recesses $d^4$ of the tumblers that have remained in their normal position, so that the locking-bar locks all the tumblers when the concave portions of the cams E engage the locking-bar D, as shown in Fig. 5. For opening the lock the reverse action takes place, the wards of the keys first turning the cams E by engaging the second projections $e^2$ and returning the cams, so as to release thereby the locking-bar D, which is by the action of its supporting-spring moved out of the recesses of the tumblers, the wards of the key engaging then the upper recesses of those tumblers which have been moved forward and returning them into their normal position, so that they clear thereby the rear end of the slide-bolt B, and permit the latter to be withdrawn from the staple of the door-jamb for opening the door. The tumblers are retained in either one of their positions by the springs $d^3$, which engage one of the notches $d^2$, before referred to. For opening and closing the door-lock the slide-bolt B is provided with a handle B′, which is guided in a socket of the bolt B and acted upon by a spiral spring, said spring pressing the handle toward one end of the guide-socket. The loose handle is to some extent a safeguard for the lock, as it prevents meddling and tampering with the lock by parties not conversant with its construction.

My improved freight-car-door lock has the advantage that any of the keys supplied with a number of door-locks can be used for closing the locks, but that only one key—namely, that one by which the closing of the lock has been accomplished—can be used for opening it again. The bits of each of said keys are arranged in groups of contiguous bits, one or more, as the case may be, which groups are of width measured in a direction parallel to the longitudinal axis of the key and are equal to the thickness of the corresponding group of contiguous tumblers, which it is intended the said key shall select out and shift to the locked position. Thus the width of the group of bits determines the number of tumblers in any group of contiguous locked tumblers, and the total number of bits on the said key determines the total number of tumblers in the corresponding combination of locked tumblers. It is evident that by using a key with a different grouping or number of bits a new combination of locked tumblers will be formed when the lock is locked by that new key, and so on through the whole series of keys. This has the advantage that no special key has to be selected for any one of the locks, but that any one of the series of keys can be used for locking the door of the freight-car, which key then goes along with the car in charge of the conductor, and is used for opening it when the car has arrived at the point of destination.

The door-lock is capable of a large number of combinations, according to the number of tumblers and cams used, the keys and their wards corresponding to the different combinations of tumblers and cams selected.

Having thus described my invention, I claim as new and desire to secure by Letters Patent—

1. The combination of a slide-bolt, a series of guided and spring-locked tumblers back of the same, a spring-actuated locking-bar engaging recesses of the tumblers, a series of pivoted cams for actuating the locking-bar, a pivoted and longitudinally-recessed key-cylinder, and a key having projecting wards, said wards being adapted to engage the tumblers and cams for actuating some of the same, substantially as set forth.

2. The combination of a slide-bolt, a series of guided and spring-locked tumblers back of the same, a spring-actuated locking-bar engaging recesses of said tumblers, a series of pivoted cams provided with projections and eccentric portions and concave portions, a pivoted and longitudinally-recessed key-cylinder, and a key having wards projecting from said key-cylinder and adapted to engage recesses of the tumblers and the projections of the cams for moving some of the tumblers and setting the locking-bar into recesses of the same, substantially as set forth.

3. The combination of an inclosing-casing, a base-plate having side plates attached to said casing, a slide-bolt guided by said side plates, a series of guided and spring-locked tumblers at the inner end of the slide-bolt, a spring-actuated locking-plate engaging recesses of the tumblers, a series of pivoted cams having projections, eccentric portions and concave portions, a pivoted and longitudinally-recessed key-cylinder, and a key having wards projecting beyond the key-cylinder and engaging recesses of the tumblers and the projections of the cams, substantially as set forth.

4. The combination of a slide-bolt, a series of guided and spring-locked tumblers, a spring-actuated locking-bar engaging recesses of said tumblers, and a series of cams having eccentric and concave portions, said cams moving the locking-bar into recesses of the tumblers, so as to lock the latter in position, substantially as set forth.

5. A key having its bits arranged in groups of contiguous bits, which groups have a width in a direction parallel to the longitudinal axis of the key equal to the thickness of the groups of contiguous tumblers which are in the locked combination of tumblers, substantially as described.

In testimony that I claim the foregoing as my invention I have signed my name in presence of two subscribing witnesses.

EUGENE CHARLES SMITH.

Witnesses:

M. T. F. GOURAUD,

C. W. BENJAMIN.